April 17, 1945.  C. E. SMITH  2,374,044

ELECTRONIC CONTROL SYSTEM

Filed May 21, 1942

INVENTOR
Clyde E. Smith.
BY
F. W. Lyle
ATTORNEY

Patented Apr. 17, 1945

2,374,044

UNITED STATES PATENT OFFICE 2,374,044

ELECTRONIC CONTROL SYSTEM

Clyde E. Smith, Wilkinsburg, Pa., assignor to Westinghouse Electric & Manufacturing Company, East Pittsburgh, Pa., a corporation of Pennsylvania Application May 21, 1942, Serial No. 443,937

11 Claims. (Cl. 171—119)

This invention relates to an electronic control system, and has particular relation to a system, such as is employed in resistance welding, in which current is supplied from a source of power to a load under the control of electric discharge valves.

In resistance spot welding apparatus constructed in accordance with the teachings of the prior art, a pair of inversely connected ignitrons are interposed between an alternating current source and the welding transformer for controlling the flow of current to the transformer. For each weld, the ignitrons are rendered conductive alternately in successive half-periods of the source during a predetermined interval of time which is measured in terms of half-periods of the source. The ignitrons are rendered conductive by control valve means responsive to a control potential which is derived from the source through a phase shifting circuit. The effective value of the current supplied to the transformer during the predetermined time interval is then regulated by adjusting the phase of the control potential to predetermine the phase points in the half-periods of the source at which the ignitrons are rendered conductive. In this manner a preselected number of spaced current impulses are supplied to the transformer for each weld.

In many welding operations, the amount of energy supplied to the welding transformer for a weld must be such as to provide a precisely determined welding heat. If too much heat is provided, the material is burned. On the other hand, if too little heat is provided, the material is not properly fused. In other words, unless the proper amount of energy is supplied, an imperfect weld is produced and a region is formed in the material at which a dangerous rupture may be started. By proper adjustment of the number of half-periods in which welding current flows and the phase point in each half-period at which the flow of current through an ignitron is initiated, the energy supplied for a weld may be precisely determined as long as the effective value of the source potential remains constant. However, in the usual power system employed for resistance welding, the effective value of the source potential is subject to numerous fluctuations of considerable magnitude as the result of such conditions as a lack of capacity of the system or a widely varying load. In any case, it is apparent that when the effective value of the source potential decreases, the effective value of the current conducted to the transformer, and, therefore, the amount of energy supplied for welding, decreases. Accordingly, when the source potential increases, the amount of energy supplied increases. It follows that to maintain the amount of energy supplied within satisfactory limits, it is necessary to compensate for fluctuations in the source potential.

Since changes of fluctuations in the source potential may occur with considerable rapidity, it is impossible to compensate for the fluctuations by manually adjusting the phase points at which the ignitrons become conductive in the half-periods. The Washburn patent, No. 2,046,712, and the Gulliksen patent, No. 2,217,476, show apparatus for compensating for fluctuations in the source potential by automatically varying or shifting the phase of the control potential in accordance with the fluctuations. While the Washburn and Gulliksen systems are, on the whole, satisfactory, difficulties have been encountered in certain respects in their use. The addition of the compensating apparatus to these systems increases the cost of the entire system considerably. This increase in the cost is due, not only to the addition of a number of elements, but also to the fact that the circuit parameters of both compensating systems are rather critical. Because of the critical nature of the circuit parameters, both systems require careful manufacture and accurate adjustment in the field.

It is accordingly an object of my invention to provide a new and improved control system for resistance welding apparatus in which a predetermined amount of energy is supplied for a weld regardless of variations in the source potential.

It is a more general object of my invention to provide novel apparatus for supplying a preselected number of spaced current impulses from a source of potential to a load in which variation in the effective value of the current supplied during the preselected number of impulses in response to variations in the effective value of the source potential is avoided.

Another object of my invention is to provide apparatus for controlling the amount of energy supplied from a source of potential to a load by a preselected number of spaced current impulses in which means are provided to compensate for variations in the source potential.

Another object of my invention is to provide apparatus for supplying spaced current impulses from a source of periodically pulsating potential to a load through electrical discharge valve means in which a predetermined amount of energy is supplied to the load by each of the impulses regardless of fluctuations in the effective value of the source potential.

More specifically, it is an object of my invention to provide apparatus for supplying spaced current impulses from a source of potential to a welding transformer for a predetermined interval of time in which the amount of energy supplied during the predetermined interval of time is maintained constant regardless of variations in the effective value of the source potential.

In accordance with my invention, a control circuit is provided for the control valve means which is adapted to effect ignition of one of the ignitrons when the control potential impressed in the control circuit rises above a predetermined critical value. Means are then provided for impressing a control potential in the control circuit made up of a periodically pulsating potential having a sloping wave front superimposed on a continuous potential which varies in magnitude in accordance with the effective value of the source potential. The control potential thus formed has a frequency and magnitude such as to rise above the critical value in each half-period of the alternating current source. As long as the effective value of the source potential remains constant, the control potential rises above the critical value at a selected instant in each half-period of the source. However, upon a variation in the effective value of the source potential, the continuous potential component of the control potential is varied accordingly to raise or lower the control potential with respect to the critical value. Since the pulsating potential component of the control potential has a sloping wave front, an increase in the continuous potential component causes the control potential to rise above the critical value earlier in each half-period of the source, and a decrease in the continuous potential component causes the control potential to rise above the critical value later in each half-period of the source. The degree of change in the point of ignition of the ignitron is so arranged that the amount of energy supplied remains constant.

The novel features that I consider characteristic of my invention are set forth with particularity in the claims. The invention itself, however, both as to its organization and its method of operation, together with additional objects and advantages thereof will best be understood from the following description of a specific embodiment when read in connection with the accompanying drawing. In the drawing:

Figure 1:
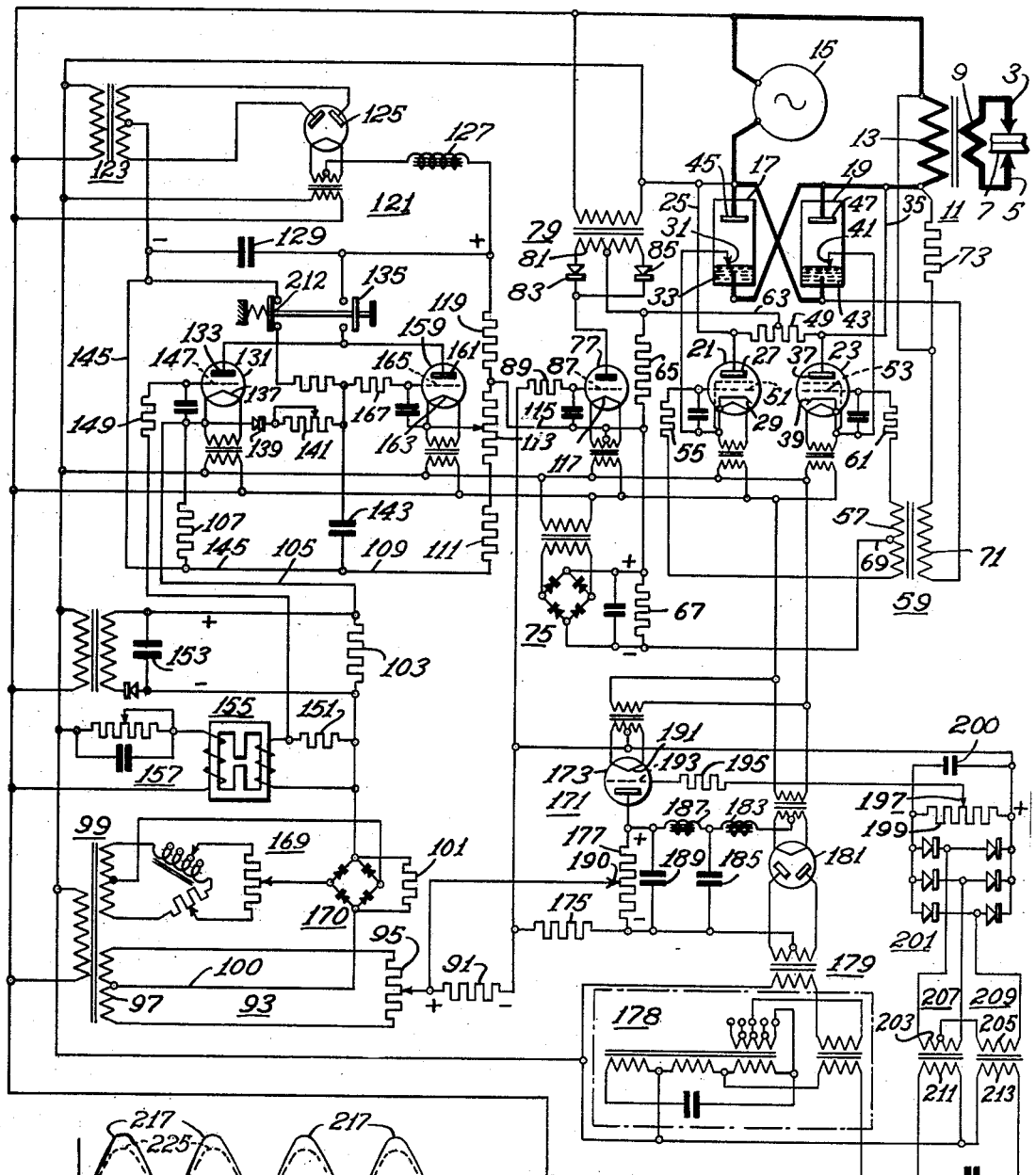
Figure 1 illustrates a specific embodiment of my invention.

In the apparatus as shown in the drawing, a pair of welding electrodes 3 and 5 engage the material 7 to be welded and are connected across the secondary 9 of a welding transformer 11. The primary 13 of the welding transformer is supplied with power from a source of alternating current potential 15 through a pair of inversely-connected ignitrons 17 and 19. A pair of electric discharge devices 21 and 23, preferably thyratrons, which are hereinafter designated as firing valves, are arranged to control the ignition of the ignitrons 17 and 19. The ignition circuit for one of the ignitrons 17 extends from one side of the source 15 through a conductor 25, the anode 27 and cathode 29 of the firing valve 21, the igniter 31 and cathode 33 of the ignitron 17 and the primary 13 of the welding transformer to the other side of the source. The ignition circuit of the other ignitron 19 may be traced from the other side of the source 15 through the primary 13 of the welding transformer, a conductor 35, the anode 37 and cathode 39 of the firing valve 23, the igniter 41 and cathode 43 of the ignitron 19 to the other side of the source. It is to be noted that the anode 27 of firing valve 21 is always of the same polarity as the anode 45 of the corresponding ignitron 17, and the anode 37 of firing valve 23 is of the same polarity as the anode 47 of ignitron 19. Thus, when a firing valve becomes conductive, ignition of the corresponding ignitron is effected. When an ignitron becomes conductive, the ignition circuit through the corresponding firing valve is short-circuited by the discharge path through the ignitron, and the firing valve is rendered non-conductive. The ignitron then becomes non-conductive at the end of the half-period of the source potential in which it was ignited.

The anodes 27 and 37 of the firing valves 21 and 23 are interconnected by a resistor 49. The grid 51 of one firing valve 21 is connected to the grid 53 of the other firing valve 23 in a circuit extending through a grid resistor 55, a secondary 57 of an auxiliary transformer 59, and another grid resistor 61. The center tap 63 of the resistor 49 interconnecting the anodes of the firing valves is connected through a pair of resistors 65 and 67 to the center tap 69 of the secondary 57 of the auxiliary transformer. The control circuit of the firing valve 21 may then be traced from its grid 51 through the grid resistor 55 and a portion of the secondary 57 to the center tap 69 and thence through the resistors 67 and 65 to the center tap 63 of the resistor 49. The control circuit then continues from one end of the resistor 49 through the conductor 35, the cathode 33 and igniter 31 of the ignitron 17 to the cathode 29 of the firing valve 21. The control circuit of the other firing valve 23 may be traced from grid 53 through resistor 61, a portion of secondary 57, resistors 67 and 65, a portion of resistor 49, conductor 25, cathode 43 and igniter 41 of ignitron 19 to the cathode 39 of the valve.

An alternating potential derived from the source 15 appears across the resistor 49 interconnecting the anodes of the firing valves. To eliminate the influence of this alternating potential from the control circuits of the valves 21 and 23, the primary 71 of the auxiliary transformer 59 is connected oppositely across the source 15. Thus the potential appearing across the secondary 57 of the auxiliary transformer 59 balances out the potential appearing across the resistor 49 interconnecting the anodes of the firing valves. A resistor 73 is connected across the primary of the welding transformer to absorb current surges and prevent back-fire of the ignitrons.

It is apparent that the two resistors 65 and 67 are common to the control circuits of both firing valves 21 and 23. A direct current biasing potential is impressed across the resistor 67 from an auxiliary source 75. This biasing potential is of such polarity and magnitude as to normally maintain the firing valves non-conductive. The other resistor 65 is connected in series with another electric discharge device 77 in an auxiliary circuit. The device 77 is preferably a thyratron and is designated hereinafter as the control valve. Another auxiliary transformer 79 is energized from the alternating current source, and its secondary 81 is connected in circuit with control valve 77 and resistor 65 through a pair of rectifiers 83 and 85. The arrangement is such that a rectified alternating current potential is thereby impressed on the auxiliary circuit, as shown at 217 in Fig. 2. When the control valve 77 becomes conductive, current flows through the resistor 65 in series therewith until the end of the half-period of the alternating current potential, at which time the anode-cathode potential of the control valve reaches zero and the valve ceases to conduct. The current flowing through the resistor 65 develops a potential thereacross of such polarity and magnitude as to counteract the biasing potential across the resistor 67 in the control circuits of the firing valves. The particular firing valve whose anode is positive at the instant the control valve becomes conductive, is then rendered conductive to effect ignition of the corresponding ignitron.

The control circuit for the control valve 77 may be traced from the grid 87 thereof through a grid resistor 89, another resistor 91, a balancing bridge 93 including a resistor 95 and secondary 97 of an auxiliary transformer 99, conductor 100, resistors 101 and 103, conductor 105, another resistor 107, a conductor 109, a pair of resistors 111 and 113 and conductor 115 to the cathode 117 of the valve. The pair of resistors 111 and 113 are connected in series with a third resistor 119. A direct current potential is impressed across the series connected resistors 111, 113 and 119 from an auxiliary source 121 comprising a transformer 123, a rectifier 125 and filtering elements 127 and 129. As will be explained hereinafter, the potential thus developed across the resistors 111 and 113 in the control circuit of the control valve 77 is of such polarity and magnitude as to render the grid 87 highly negative with respect to the cathode 117.

An electric discharge valve 131, preferably a thyratron, has its anode 133 connected through a push-button switch 135 to the positive terminal of the direct current source 121. The valve 131 is designated as a "start" valve and its cathode 137 is connected through a rectifier 139, a potentiometer 141, a capacitor 143 and a conductor 145 to the negative terminal of the source. The resistor 107 is connected in parallel with the rectifier 139, potentiometer 141, and capacitor 143. Thus, when the start valve 131 is conductive, the terminal of the resistor 107 which is connected to the cathode 137 of the start valve becomes positive with respect to the cathode 117 of the control valve 77. As a result, the grid 87 of the control valve becomes less negative with respect to the cathode 117.

The control circuit of the start valve 131 may be traced from its grid 147 through a grid resistor 149 and resistors 151 and 103 to the cathode 137. A direct current biasing potential is impressed across the resistor 103 from an auxiliary source 153 and is of such polarity as to tend to maintain the start valve 131 non-conductive. A potential impulse is periodically impressed across the resistor 151 through an impulse transformer 155 energized from the alternating current source 15 through a phase-shifting circuit 157. The phase-shifting circuit 157 is adjusted so that the potential impulse is impressed across the resistor 151 at an instant in the period of the alternating current source corresponding to the power factor of the load. The potential impulse across the resistor 151 is sufficient to counteract the biasing potential across the resistor 103. Thus, when the push-button switch 135 is closed, the start valve 131 is rendered conductive by the next succeeding potential impulse across the resistor 151.

Current flowing through the start valve 131 charges the capacitor 143 at a rate determined by the setting of the potentiometer 141 in series therewith. The capacitor 143 is also connected in the control circuit of another electric discharge device 159, preferably a thyratron, which is designated a "stop" valve. The anode 161 of the stop valve 159 is also connected to the positive terminal of the direct current source 121 through the push-button switch 135. The cathode 163 of the stop valve is connected to an intermediate tap on the resistor 113. The control circuit of the stop valve may then be traced from the grid 165 through the grid resistor 167, the capacitor 143, a conductor 109, resistor 111, intermediate tap of the resistor 113 to the cathode 163 of the valve. The potential appearing between the intermediate tap of the resistor 113 and the terminal of the resistor 111 which is connected to conductor 109, normally maintains the stop valve non-conductive. However, a predetermined interval of time after the start valve 131 becomes conductive, as determined by the setting of the potentiometer 141, the potential across the capacitor 143 rises to a value sufficient to counteract the biasing potential in the control circuit of the stop valve 159 to render it conductive. Upon the stop valve becoming conductive, the intermediate tap of the resistor 113 is connected through the stop valve to the positive terminal of the direct current source 121. Thus the terminal of resistor 113 which is connected to the cathode of the control valve, again becomes positive with respect to the grid.

A second phase-shifting circuit 169 is energized from the alternating current source 15 and the potential derived therefrom is rectified by rectifier system 170 and impressed across the resistor 101 in the control circuit of the control valve 77. The direction of rectification is such that the potential appearing across the resistor 101 has the wave form of an inverted rectified alternating potential with respect to the grid. As will be explained hereinafter, the phase position of the potential across the resistor 101 is adjusted to determine the instant in a half-period of the alternating source at which the control valve 77 is rendered conductive.

A direct current potential is impressed across the other resistor 91 in the control circuit of the control valve 77 by a voltage compensating circuit 171. A vacuum discharge device 173 and a resistor 175 are connected in series across the end terminals of a voltage divider 177. A substantially constant direct current potential is impressed across the voltage divider 177. This potential is derived from the alternating source 15 through a voltage regulator 178, an auxiliary transformer 179, a rectifier 181 and several filtering elements 183, 185, 187, 189. The voltage regulator 178 shown in the drawing is the well-known type manufactured by the Raytheon Manufacturing Company, although any suitable regulator may be used. The purpose of the regulator is to prevent the potential across divider 177 from varying with fluctuations in the source.

The intermediate tap 190 of the voltage divider 177 is connected to one side of the resistor 91, while the other side of the resistor 91 is connected to the cathode 191 of the vacuum device 173. This vacuum discharge device is of the type whose resistivity varies in accordance with variations in the magnitude of the potential impressed across the grid 193 and cathode 191 of the device, an R. C. A. 2A3 tube being satisfactory. The grid 193 is connected through a grid resistor 195 to an intermediate tap 197 on another voltage divider 199 whose positive terminal is connected to the cathode 191. A direct current potential is also impressed across the second voltage divider 199 and its magnitude varies with variations in the magnitude of the alternating source potential. The potential across the second divider 199 is derived from a three-phase rectifying system 201 energized from a pair of auxiliary transformers 207 and 209. The primary 211 of one transformer 207 is connected directly across the alternating current source 15 and the primary 213 of transformer 209 is connected across the alternating current source 15 through a capacitor 215. The secondaries 203 and 205 of the transformers 207 and 209, respectively, are interconnected in a well-known manner to deliver three-phase alternating potential to the rectifying system. A small filter capacitor 200 is connected across the divider 199 so that the resultant potential appearing between the grid and cathode of device 173 is only varied to any appreciable degree when the effective value of the source potential varies.

As the grid-cathode potential of the vacuum discharge device 173 increases, the resistivity of the device to the flow of current increases. The current flowing through the resistor 175 in series with the device 173 then decreases as does the potential developed thereacross by that current. It is then apparent that the potential across the resistor 91 varies in accordance with the potential across resistor 175 and, therefore, in accordance with the source potential. However, because of the amplification effected through device 173 a slight change in the R. M. S. value of the source potential produces a comparatively large change in the direct current potential on resistor 91.

Figure 2:
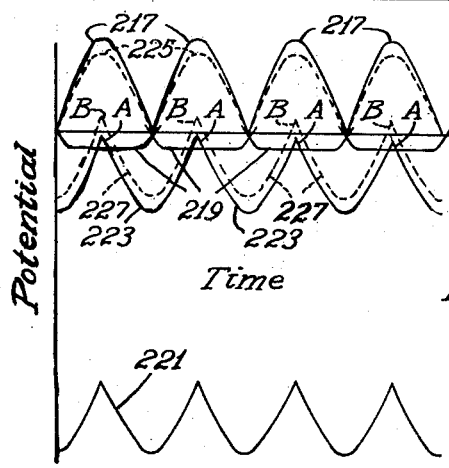
Fig. 2 is a graph illustrating the operation of the apparatus of Fig. 1.

The operation of the apparatus shown in Fig. 1 may be more readily understood with reference to Fig. 2. The periodically pulsating potential impressed in the auxiliary circuit including the anode and cathode of the control valve 77 is shown by a full-line curve 217. The critical potential of the control valve is then shown by the curve 219. As is well known in the art, the control valve is rendered conductive at the instant its grid-cathode potential rises above the critical potential 219. Before operation of the start valve 131 the control potential impressed in the control circuit of the control valve 77 is shown as the lower curve 221 in Fig. 2. This curve 221 represents the sum of the continuous or non-pulsating potentials impressed across resistors 91, 103, 111, and 113 and the pulsating potential impressed across the resistor 101 through the phase-shifting circuit 169. Because of the highly negative continuous potentials the net potential 221 does not rise above the critical potential 219 of the control valve.

To initiate a welding operation, the push-button switch 135 is closed. The start valve 131 then becomes conductive when the next potential impulse is impressed across the resistor 151 in its control circuit. When the start valve 131 becomes conductive, the sum of the continuous potentials in the control circuit of the control valve 77 becomes less negative because the terminal of resistor 107 connected to the cathode of the start valve becomes positive with respect to the cathode of the control valve leaving only the potentials across 103, 101 and 91 tending to keep the grid of the control valve negative. As a result the net control potential curve is raised to the position shown at 223 in Fig. 2. In this position, the control potential 223 rises above the critical potential 219 at a point A in each period of the pulsating potential 217 or each half-period of the alternating current source. The phase position of the point A is determined by the setting of the phase-shifting circuit 169, and may be adjusted as desired. However, the phase position of the pulsating potential component of the control potential which is impressed across the resistor 101 in the control circuit remains constant throughout the welding operation. It is to be understood that the balancing bridge 93 ordinarily does not affect the control potential. However, if the firing characteristics of the ignitrons should differ, the bridge may be set so that it is slightly unbalanced. As a result the control potential becomes slightly higher in the half-periods of the alternating potential in which one ignitron is rendered conductive than in the other half-periods and so compensates for the difference in the characteristics of the ignitrons.

If the magnitude of the alternating current source potential decreases for any reason, the potential impressed across the resistor 91 and therefore the sum of the constant potentials in the control circuit of the control valve 77 is varied accordingly. The decrease in the source potential is indicated as a decrease in the potential in the anode-cathode circuit of the control valve 77 as shown by the dotted curve 225 in Fig. 2. Since the potential impressed across the resistor 91 varies in accordance with variations in the source potential, a decrease in the source potential causes the sum of the continuous potentials to become less negative. As a result, the potential curve 223 is raised with respect to the critical value 219 to the position illustrated by the dotted curve 227 in Fig. 2. Since the pulsating potential component has a sloping wave front, the raising of the curve causes the control potential to rise above the critical potential at an earlier point B in the half-period of the alternating source. Consequently the control valve 77 becomes conductive earlier in each period of the pulsating potential 217 and current flows through the ignitrons 17 and 19 to the welding transformer for a longer period of time in each half-period of the source. However, since the effective value of the source potential is less, the amount of energy supplied to the transformer remains constant.

A predetermined time interval after the firing of the start valve, the capacitor 143 in the control circuit of the stop valve 159 becomes charged sufficiently to render the stop valve conductive. When the stop valve becomes conductive, the sum of the continuous potentials impressed in the control circuit of the control valve 77 again becomes highly negative so that the control potential curve is lowered sufficiently to prevent further conductivity by the ignitrons. The push-button switch may then be released and another welding operation may be initiated by reclosing it. A second contactor 212 on the push-button switch is closed when the switch is released to complete a discharging circuit for the capacitor 143 and condition the capacitor for a succeeding operation.

Although I have shown and described a specific embodiment of my invention, I am fully aware that many modifications thereof are possible. My invention therefore is not to be restricted except insofar as is necessitated by the prior art and by the spirit of the appended claims.

I claim as my invention:

1. For use in controlling the supply of current from a source of periodically pulsating potential to a load, the combination comprising valve means interposed between said source and load for controlling the flow of current to the load, control means for said valve means, said valve means being adapted to be rendered conductive by the application to said control means of a potential greater than a predetermined critical value, and means for applying to said control means a plurality of potential impulses having sloping wave fronts, superimposed on a direct current potential which varies in accordance with the effective value of said source potential, the net potential applied to said control means rising above said critical value in each period of said source, whereby the instant in each period at which the valve means becomes conductive is determined according to said effective value.

2. For use in controlling the supply of current from a source of periodically pulsating potential to a load, the combination comprising electric discharge valve means of the arc-like type interposed between said source and load for controlling the flow of current to the load, control means for said valve means, said valve means being adapted to be rendered conductive by the application to said control means of a potential greater than a predetermined critical value, and means for applying to said control means periodic potential impulses of the same frequency as said source and having sloping wave fronts, superimposed on a direct current potential which varies in magnitude in accordance with variations in the effective value of said source potential, the net potential applied to said control means being of such magnitude as to rise above said critical potential in each period of said source, whereby the instant in each period at which the valve means becomes conductive is determined according to said effective value.

3. For use in controlling the supply of current from a source of periodically pulsating potential to a load, the combination comprising valve means interposed between said source and load for controlling the flow of current to the load, control means for said valve means, said valve means being adapted to be rendered conductive by the application to said control means of a potential greater than a predetermined critical value, means for applying to said control means a plurality of potential impulses having sloping wave fronts, superimposed on a direct current potential, the net potential applied to said control means rising above said critical value in each period of said source, said potential applying means having means for varying the magnitude of said direct current potential in accordance with variations in the effective value of said source potential including means for amplifying the degree of variation of said effective value in said direct current potential so that the instant in each period at which the net potential rises above said critical value is varied to maintain the effective value of the current supplied to the load constant regardless of variations in the effective value of said source potential.

4. For use in controlling the supply of current from a source of periodically pulsating potential to a load, the combination comprising valve means interposed between said source and load for controlling the flow of current to the load, control means for said valve means, said valve means being adapted to be rendered conductive by the application to said control means of a potential greater than a predetermined critical value, means for applying to said control means a second periodically pulsating potential of the same frequency as said source potential including means for adjusting the phase of said second potential relative to said source potential, the pulsations of said second potential having sloping wave fronts, and means for also applying to said control means a direct current potential which varies in magnitude in accordance with the effective value of said source potential, the net potential applied to said control means rising above said critical value in each period of said source, whereby the instant in each period at which said valve means becomes conductive is varied according to said effective value.

5. For use in controlling the supply of current from a main source of periodically pulsating potential to a load, the combination comprising valve means interposed between said main source and load for controlling the flow of current to the load, control means for said valve means, said valve means being adapted to be rendered conductive by the application to said control means of a potential greater than a predetermined critical value, an auxiliary source of substantially constant potential, means for deriving a potential from said auxiliary source which varies in accordance with variations in the effective value of said main source potential but with a greater degree of variation, means for applying said derived potential to said control means, and means for also applying to said control means a plurality of periodic potential impulses having sloping wave fronts, the net potential applied to said control means rising above said critical value in each period of said main source potential, whereby the instant in each period at which the valve means becomes conductive is determined according to said effective value.

6. For use in controlling the supply of current from a main source of periodically pulsating potential to a load, the combination comprising valve means interposed between said main source and load for controlling the flow of current to the load, an auxiliary source of substantially constant potential, means for deriving a potential from said auxiliary source which varies in accordance with variations in the effective value of said main source potential, and means for rendering said valve means conductive in each period of said main source potential at an instant the phase point of which is determined by the magnitude of said derived potential, said potential deriving means including means for amplifying the degree of variation of said effective value in said derived potential so that the phase point of said instant is varied to maintain the effective value of the current supplied to the load constant regardless of variations in the effective value of the main source potential.

7. For use in controlling the supply of current from a main source of periodically pulsating potential to a load, the combination comprising valve means interposed between said main source potential and load for controlling the flow of current to the load, control means for said valve means, said valve means being adapted to be rendered conductive by the application to said control means of a potential greater than a predetermined critical value, an auxiliary source of substantially constant potential, means for deriving a potential from said auxiliary source which varies in accordance with variations in the effective value of the main source potential, means for applying said derived potential to said control means, means for also applying a plurality of potential impulses having sloping wave fronts to said control means, the net potential applied to said control means rising above said critical value in each period of said source potential, said potential deriving means including means for amplifying the degree of variation of said effective value in said derived potential to an extent that the instant in each period at which the valve means becomes conductive is varied to maintain the effective value of the current supplied to the load constant regardless of variations in the effective value of the main source potential.

8. For use in controlling the supply of current from a main source of periodically pulsating potential to a load, the combination comprising valve means interposed between said source and load for controlling the flow of current to the load, an auxiliary source of substantially constant potential, means for deriving a potential from said auxiliary source including a vacuum electric discharge device and a resistance connected in series across said auxiliary source and means for varying the internal impedance of said device in accordance with variations in the effective value of said main source potential, whereby the magnitude of said control potential is varied according to said effective value, and means for rendering said valve means conductive in each period of said main source at an instant the phase point of which is determined by the magnitude of said derived potential.

9. For use in controlling the supply of current from a main source of periodically pulsating potential to a load, the combination comprising valve means interposed between said main source and load for controlling the flow of current to the load, control means for said valve means, said valve means being adapted to be rendered conductive by the application to said control means of a potential greater than a predetermined critical value, an auxiliary source of substantially constant potential, means for deriving a potential from said auxiliary source including a vacuum electric discharge device and a resistance connected in series across said auxiliary source and means for varying the internal impedance of said device in accordance with variations in the effective value of said main source potential, whereby the magnitude of said derived potential is varied, means for applying said derived potential to said control means, and means for also applying to said control means a plurality of potential impulses having sloping wave fronts, the net potential applied to said control means rising above said critical value in each period of said main source potential, whereby the instant in each period at which the valve means becomes conductive is determined according to said effective value.

10. For use in controlling the supply of current from a source of periodically pulsating potential to a load, the combination comprising valve means interposed between said source and load for controlling the flow of current to the load, control means for said valve means, said valve means being adapted to be rendered conductive by the application to said control means of a potential greater than a predetermined critical value, means for applying to said control means periodic potential impulses of the same frequency as said source potential and having sloping wave fronts, superimposed on a continuous potential which varies in accordance with variations in the effective value of said source potential, said last named means including means for normally maintaining said continuous potential at a first level such that the net potential applied to said control means remains below said critical value and means for raising said continuous potential for a predetermined time interval to a second level such that the net potential rises above said critical value in each period of said source potential during said time interval, the instant in each period during said time interval at which said valve means becomes conductive being varied in accordance with variations in said effective value.

11. For use in controlling the supply of current from a main source of single phase alternating potential to a load, the combination comprising valve means interposed between said source and load for controlling the flow of current to the load, means for producing a direct current potential which varies in accordance with the effective value of said source potential including means for converting the single phase potential of said source into a multiple phase potential and means for rectifying said multiple phase potential, an auxiliary source of substantially constant potential, a vacuum electric discharge device and a resistance connected in series across said auxiliary source, a control circuit for said device, means for impressing said direct current potential in said control circuit whereby the internal impedance of said device is varied in accordance with said effective value, and means for rendering said valve means conductive in each period of said main source at an instant the phase point of which is determined by the magnitude of the potential across said resistance.

CLYDE E. SMITH.